US010145725B2

United States Patent
Shatters et al.

(10) Patent No.: US 10,145,725 B2
(45) Date of Patent: *Dec. 4, 2018

(54) METHOD OF CALIBRATION OF WEIGHING SYSTEMS

(71) Applicant: Caterpillar Inc., Peoria, IL (US)

(72) Inventors: Aaron Robert Shatters, Montgomery, IL (US); Michael Anthony Spielman, Jr., Brookfield, IL (US)

(73) Assignee: Caterpillar Inc., Deerfield, IL (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/135,305

(22) Filed: Apr. 21, 2016

(65) Prior Publication Data

US 2016/0238436 A1    Aug. 18, 2016

(51) Int. Cl.
*G01G 23/01* (2006.01)
*G01G 19/08* (2006.01)

(52) U.S. Cl.
CPC .............. *G01G 23/01* (2013.01); *G01G 19/08* (2013.01)

(58) Field of Classification Search
CPC ............................... G01G 23/01; G01G 19/08
See application file for complete search history.

(56) References Cited

U.S. PATENT DOCUMENTS

| 5,105,896 A | 4/1992 | Kyrtsos | |
|---|---|---|---|
| 6,919,516 B2 | 7/2005 | Frye et al. | |
| 8,311,844 B2* | 11/2012 | McCaherty | G01G 19/08 705/1.1 |
| 8,626,541 B2 | 1/2014 | Doan et al. | |
| 8,660,758 B2* | 2/2014 | Janardhan | E02F 9/264 177/139 |
| 9,695,571 B1* | 7/2017 | Ge | E02F 3/431 |
| 2008/0119967 A1 | 5/2008 | Long et al. | |
| 2016/0223387 A1* | 8/2016 | Talmaki | G01G 23/01 |

FOREIGN PATENT DOCUMENTS

| EP | 2045587 | 4/2009 |
|---|---|---|
| WO | 2014203118 | 12/2014 |

* cited by examiner

*Primary Examiner* — Vanthu Nguyen
(74) *Attorney, Agent, or Firm* — Derek J. Somogy; Bookoff McAndrews

(57) ABSTRACT

A method of calibrating a weighing system associated with a worksite is provided. The method includes, receiving, from the weighing system, readings indicative of a payload on a first set of machines and a second set of machines of the worksite. The second set of machines are configured to receive a payload from the corresponding first set of machines. The method also includes formulating a predefined number of equations from the readings and determining error coefficients of the weighing system by optimizing the predefined number of equations. The method further includes calibrating the weighing system based on the determined error coefficients.

20 Claims, 3 Drawing Sheets

METHOD OF CALIBRATION OF WEIGHING SYSTEMS

TECHNICAL FIELD

The present disclosure generally relates to weighing systems. More particularly, the present disclosure relates to a method of calibrating the weighing systems.

BACKGROUND

Typically, machines such as, wheel loader or an excavator used for hauling material in an aggregate quarry or similar operation, are associated with a weighing system. The weighing system may include multiple payload scales that are used to measure various weights such as, a weight of an inbound empty machine, a weight of the outbound loaded machine, a weight of the delivered payload, and/or the hauled weight.

The problem generally encountered during such operation is related to maintaining the accuracy of the payload scales. One or more of these scales may generally present an unknown error and it may also be difficult to determine the magnitude of the error. The machine may end up carrying extra weight or lesser weight from the site if any of the payload scales are faulty or inaccurate.

As such, the payload scales may need to be periodically calibrated in order to achieve a desired level of accuracy. Typically, results from two of the scales may be compared in an effort to confirm the accuracy of the scales. However, if the results are not in agreement, this comparison does not yield information that identifies which scale is out of calibration. Further, it may be inefficient or not be cost effective to add a third measurement for the sake of accuracy.

Such addition may make it challenging to know which scales require inspection and/or calibration, resulting in a great deal of manual investigation and troubleshooting. Moreover, during the time between their scheduled calibrations, the accuracy of the scales and/or the empty weight of a truck can shift for various reasons. As such, there exists a need for a method of maintaining the accuracy of the weighing system.

SUMMARY OF THE DISCLOSURE

In accordance with one aspect of the present disclosure, a method of calibrating a weighing system associated with a worksite is provided. The worksite has a first set of machines and, a second set of machines configured to receive a payload from corresponding first set of machines. The method includes receiving, from the weighing system, a first set of readings indicative of the payload on the first set of machines. The method also includes receiving, from the weighing system, a second set of readings indicative of an equivalent payload on the second set of machines. The equivalent payload is received from the corresponding first set of machines. The method further includes formulating a predefined number of equations from the first set of readings and the corresponding second set of readings. The method includes determining error coefficients of the weighing system by optimizing the predefined number of equations. The method also includes calibrating the weighing system based on the determined error coefficients.

Other features and aspects of this disclosure will be apparent from the following description and the accompanying drawings.

DETAILED DESCRIPTION

Figure 1:
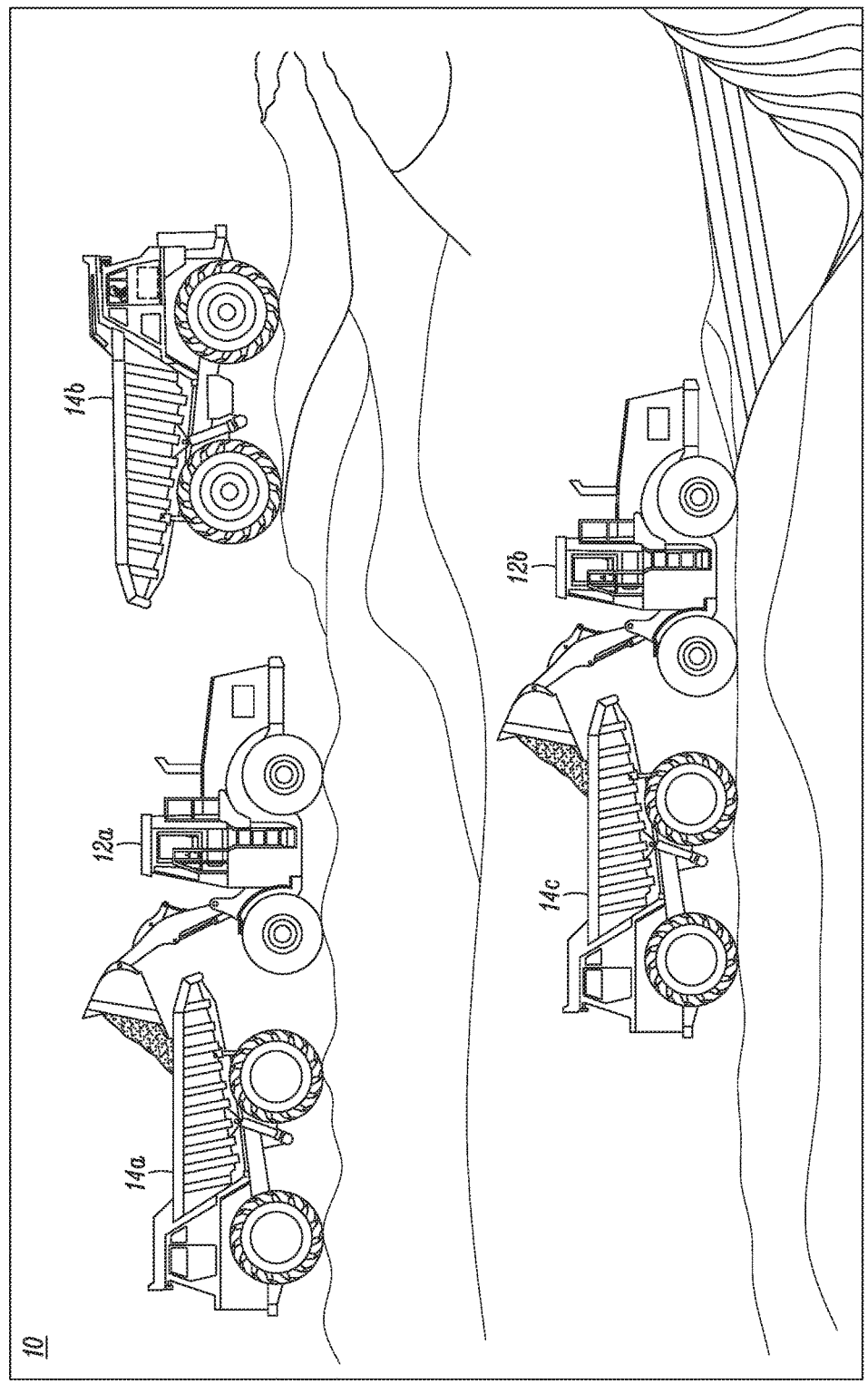
FIG. 1 is a schematic diagram of an exemplary worksite showing a first set of machines and a second set of machines in accordance with an embodiment of the present disclosure.

Wherever possible, the same reference numbers will be used throughout the drawings to refer to same or like parts. Referring to FIG. 1, an exemplary worksite 10 is illustrated. The worksite 10 includes a first set of machines 12a, 12b (collectively denoted by numeral '12') and a second set of machines 14a, 14b and 14c (collectively denoted by numeral '14'). The second set of machines 14 are configured to receive a payload from the first set of machines 12.

Accordingly, the first set of machines 12 may be trucks, wheel loaders and so on. In an example, each of the second set of machines 14 may be an excavator. However, the first and second set of machines 12, 14 may embody various other machines to suit a particular application.

In the illustrated embodiment, each of the second set of machines 14 may receive the payload and carry the payload to a customer site. Moreover, in each trip to the customer site, one of the second set of machines 14 may receive payload from any of the first set of machines 12.

Figure 2:
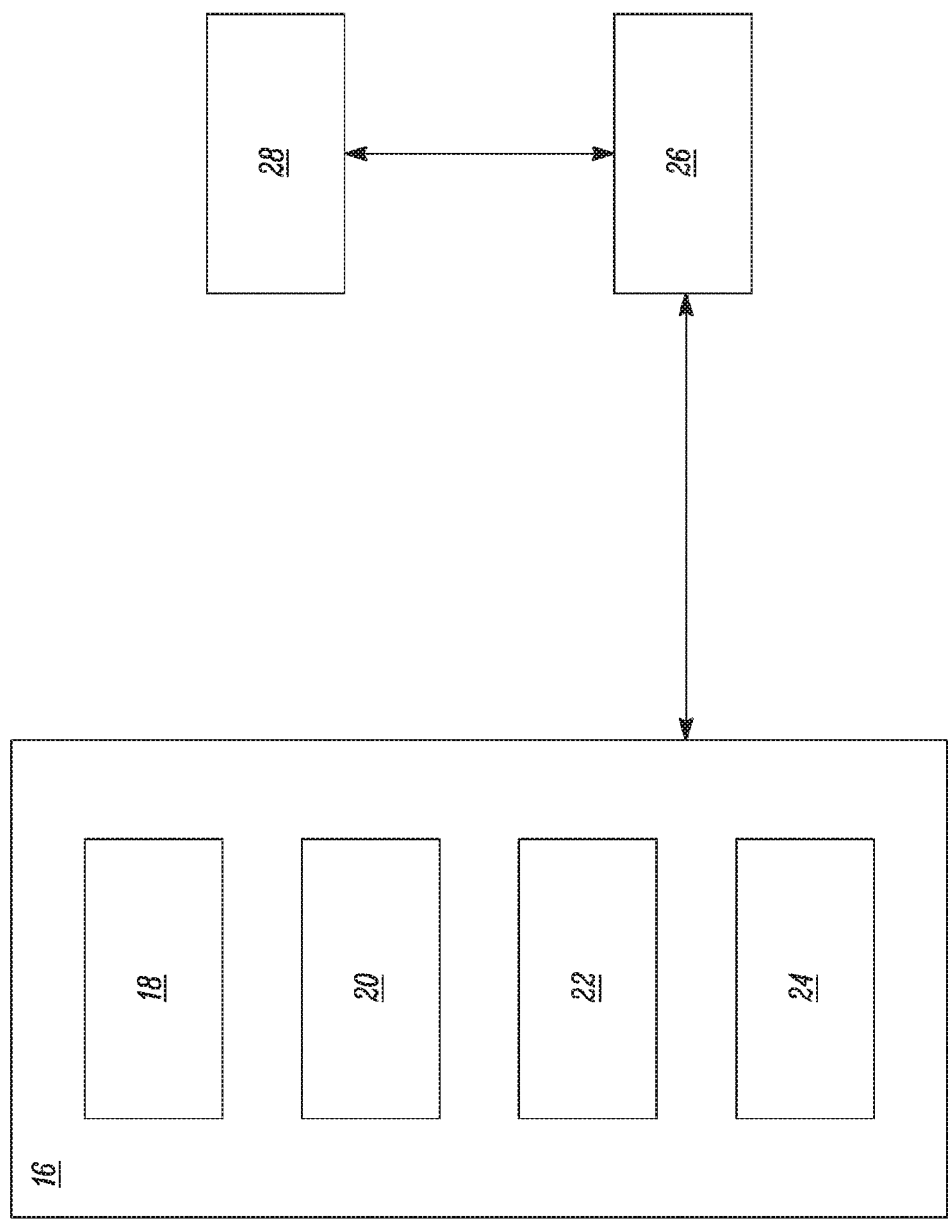
FIG. 2 is a block diagram of an exemplary weighing system in communication with a processor in accordance with an embodiment of the present disclosure.

Referring to FIG. 2, the worksite 10 may be associated with a weighing system 16. In an embodiment, the weighing system 16 may include multiple payload scales configured to measure various weights such as, a weight of the machines in various stages, weight of the payload etc.

As shown in FIG. 2, the weighing system 16 includes payload scales 18, 20, 22, 24. However, it may be contemplated that the weighing system 16 may include any number of payload scales. The payload scale 18 may be configured to measure a load on the corresponding machines among the first set of machines 12. In an embodiment, each of the first set of machines 12 may be equipped with the payload scale 18. Further, the weighing system 16 may include a payload scale 20 that is configured to provide a reading indicative of a load on the corresponding machines among the second set of machines 14. In an embodiment, each of the second set of machines 14 may be equipped with the payload scale 20.

In an embodiment, the weighing system 16 may also include a payload scale 22, and a payload scale 24 configured to provide a reading indicative of a tare weight of the second set of machines 14 and a departure weight of the second set of machines 14 respectively. The payload scales 22, 24 may be ground scales that are external to the first and second set of machines 12, 14.

Referring to FIG. 2, the weighing system 16 is in communication with a processor 26 and a memory 28. In one embodiment, the processor 26 may be directly in communication with the weighing system 16 to receive various readings. Additionally, or optionally, the processor 26 may be in communication with the memory 28. The processor 26 may be any microprocessor based system, for example, a computer system. The processor 26 may be configured to execute instructions and provide one or more outputs based on the user inputs. The processor 26 may also be configured to lookup in the memory 28 and retrieve the data from the memory 28.

In an embodiment, the memory 28 may be configured to receive the readings from the weighing system 16 associated with each of the corresponding first set of machines and second set of machines 12, 14. The memory 28 may also be configured to receive output data from the processor 26 and store the received data. In an embodiment, the memory 28 may be an external storage device such as, a database. In another embodiment, the memory 28 may be an in-built memory that is integral with the processor 26.

In an embodiment, the processor 26 is configured to calibrate the weighing system 16 which will be explained hereinafter with the help of below mentioned example.

In an example, during a trip 'A', the machine 14a from the second set of machines 14 may carry a payload received from the machine 12a from the first set of machines 12. Similarly, the machine 14a may carry the payload received from the machine 12b during a trip 'B'. Further, the machine 14b may carry the payload received from the machine 12a and the machine 12b during a trip 'C' and 'D' respectively. Also, the machine 14c may carry the payload received from the machine 12a and machine 12b during a trip 'E' and a trip 'F' respectively.

Further, the processor 26 may compare the readings from the payload scales 18, 20 to determine an error associated therewith. As described above, the payload scale 18 is configured to provide a first reading, indicative of a load on a corresponding first set of machines 12. The payload scale 20 is configured to provide a second reading, indicative of a load on the corresponding second set of machines 14. Accordingly, the processor 26 may collect a set of first and second readings for each of the trips.

As described above, each of the machines 14a, 14b, 4c from the second set of machines 14 may include the respective payload scale 20 thereon. The payload scales 20 on each of the machines 14a, 14b, 14c provide readings indicative of the payloads on the respective machines 14a, 14b, 14c. Similarly, each of the machines 12a, 12b from the first set of machines 12 may include the payload scale 18 thereon. The payload scales 18 on each of the machines 12a, 12b provide readings indicative of the payloads on the respective machines 12a, 12b.

For example, the payload scales 18, 20 of the corresponding machines 12a, 14a may provide the first reading as R1_1 and the second reading as R2_1 for the first trip 'A', respectively. Similarly, the payload scales 18, 20 of the corresponding machines 12b, 14a may provide the first reading as R1_2 and the second reading as R2_2 for the second trip 'B'. The payload scales 18, 20 of the corresponding machines 12a, 14b may have the first reading as R1_3 and the second reading as R2_3 for the third trip 'C'. The payload scales 18, 20 of the corresponding machines 12b, 14b may have the first reading as R1_4 and the second reading as R2_4 for the fourth trip 'D'. The payload scales 18, 20 of the corresponding machines 12a, 14c may have the first reading as R1_5 and the second reading as R2_5 for the fifth trip 'E'. The payload scales 18, 20 of the corresponding machines 12b, 14c may have the first reading as R1_6 and the second reading as R2_6 for the sixth trip 'F'.

If the payload scales 18, 20 do not have any error, the first and corresponding second readings are all equal to each other. However, there may be non-zero error or difference between the readings for the respective trips due to various reasons. Further, the scales 18 on each of the machines 12a, 12b may have error coefficients F1, F2 respectively. Similarly, the scales 20 on each of the machines 14a, 14b, 14c may have error coefficients F3, F4, F5. In an embodiment, the processor 26 may be configured to receive each of the first readings and the corresponding second readings for each trip. In another embodiment, the processor 26 may look-up the first readings and corresponding second readings from the memory 28. In an embodiment, the readings from each of the trips for the first and second set of machines 12, 14 may be associated with a unique identifier. As such, the processor 26 may identify the readings associated with the trip and accordingly formulate the equations with the first readings and the corresponding second readings.

The processor 26 may be further configured to formulate a predefined number of equations based on the first and second readings. In an embodiment, the predefined number of equations may be equal to product of number of first set of machines 12 and number of second set of machines 14 under consideration. In one embodiment, the payload delivered by the first set of machines 12 may be equated to the payload received by the second set of machines 14 to formulate the equations. The processor 26 may be configured to determine the error coefficients by optimizing the equations. For each of the trips, 'A', 'B', 'C', 'D', 'E', 'F', the equations 1 to 6 may be as shown below:

$$F1*R1\_1 - F3*R2\_1 = 0 \tag{1}$$

$$F2*R1\_2 - F3*R2\_2 = 0 \tag{2}$$

$$F1*R1\_3 - F4*R2\_3 = 0 \tag{3}$$

$$F2*R1\_4 - F4*R2\_4 = 0 \tag{4}$$

$$F1*R1\_5 - F5*R2\_5 = 0 \tag{5}$$

$$F2*R1\_6 - F5*R2\_6 = 0 \tag{6}$$

One solution for the above equations is that all the error coefficients F1, F2, F3, F4, F5 are zero, however, is not a preferred or optimized solution. As such, the equations present an optimization problem. Further, if each of the readings are equal to each other, then the error coefficients are equal to 1. As such, the processor 26 is configured to solve the equations so as to determine the error coefficients that are close to 1 instead of 0.

In one embodiment, the processor 26 may use suitable optimization techniques such as, but not limited to, Least Absolute Shrinkage and Selection Operator (LASSO), ridge regression method to push the error coefficient in the optimized direction. In other embodiment, the processor 26 may use other suitable optimization methods to determine the error coefficients.

In one embodiment, the processor 26 may calibrate the payload scales 18, 20, of the weighing system 16 based on the determined error coefficients. In another embodiment, the payload scales 18, 20 may be manually calibrated based on the determined error coefficients.

In another embodiment of the disclosure, the processor 26 is configured to calibrate the payload scales 22, 24, of the weighing system 16. As described above, the payload scale 22 is configured to provide a reading indicative of a tare weight of the second set of machines 14. Further, the payload scale 24 is configured to provide a reading indicative of a departure weight of the second set of machines 14. Furthermore, the payload scale 18 is configured to provide the first reading indicative of the payload on the first set of machines 12.

The processor 26 may receive, from the payload scale 18, a first reading indicative of the payload on the first set of machines 12. The processor 26 may determine or receive, from the payload scales 22, 24, a second reading indicative of the payload on the second set of machines 14. The second reading may be determined as (departure weight—tare weight) of the second set of machines 14.

The processor 26 may formulate, a predefined number of equations based on these first readings, the corresponding second readings along with associated error coefficients. For example, each of the departure weight, tare weight, and the second readings may be associated with an error coefficient. Exemplary equation (7) for a trip 'G', wherein the machine 14a receives payload from the machine 12a is given below:

$$M1*N1 = M2*N2 - M3*N3 \quad (7)$$

where,

M1 is error coefficient of payload scale 18,

N1 is the first reading of the machine 12a received from payload scale 18, M2 is error coefficient of payload scale 24, N2 is departure weight of machine 14a, received from payload scale 24, M3 is error coefficient of payload scale 22, N3 is tare weight of machine 14a, received from payload scale 22.

Similarly, required number of such equations may be formulated for various trips. In some cases, there may be an offset error in one or more of the readings. In such cases, the equations may be formed by adding a variable representing the offset error to each of the readings. Moreover, as the number of variables are increased, the processor 26 may collect more number of readings to formulate more number of equations.

The processor 26 may be configured to determine the error coefficients of the payload scales 18, 22, 24 of the weighing system by optimizing the predefined number of equations. The weighing system 16 may be then calibrated based on the determined error coefficients. Suitable, optimization techniques such as LASSO, ridge regression etc., may be employed by the processor 26.

The methods and/or processes herein (i.e., the system and/or process listed above or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers and/or similar devices.

INDUSTRIAL APPLICABILITY

The present disclosure is related to a method and the processor that finds its applicability for use and implementation in calibrating a weighing system associated with any worksite. The weighing system may include measuring devices such as payload scale. Suitable measurements from the weighing system over a period of time may be identified and analyzed to determine associated errors. Accordingly, the weighing system may be calibrated based on the determined error. Such an implementation may prevent a machine from carrying higher or lower weight to a customer site.

Figure 3:
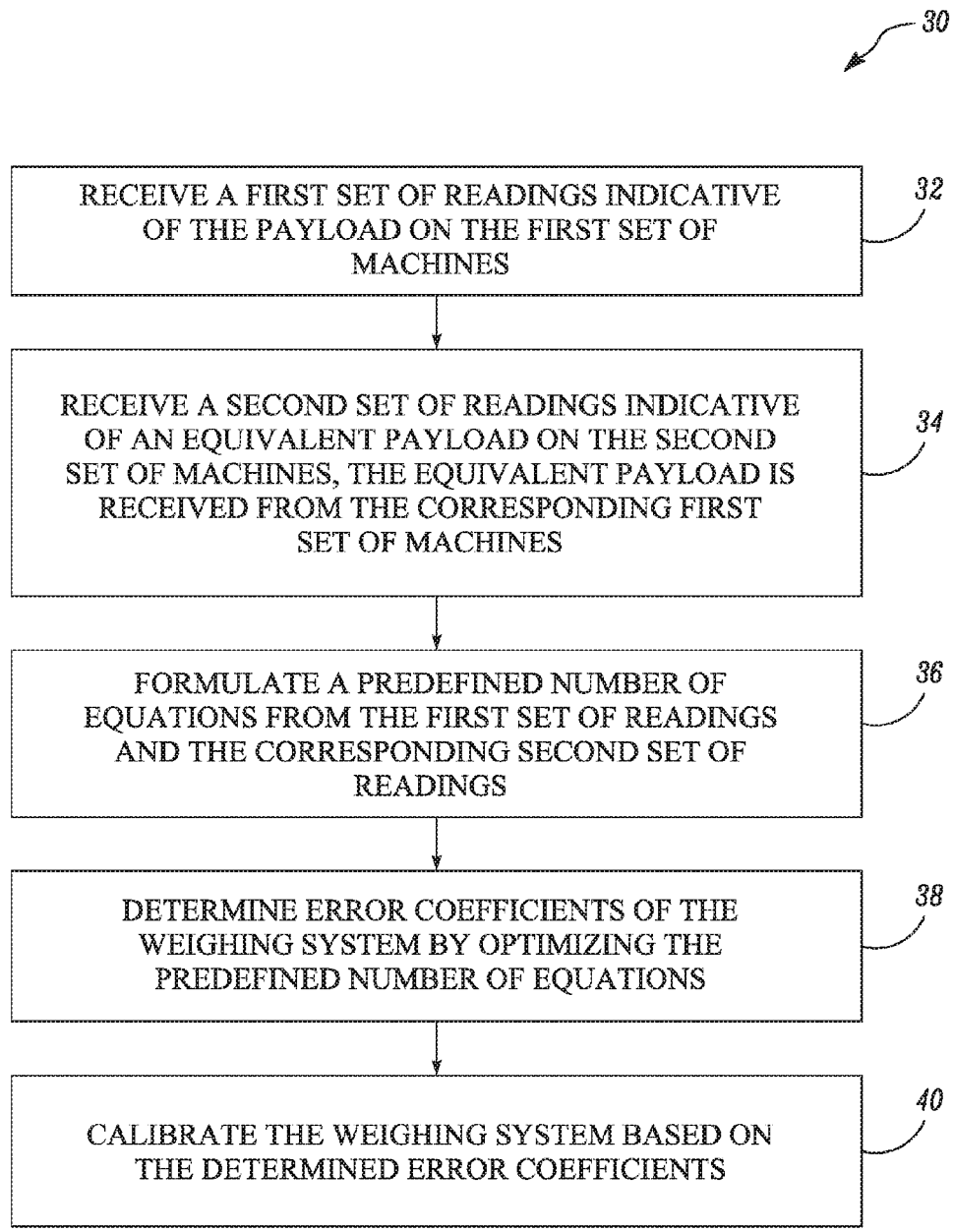
FIG. 3 is a flowchart illustrating a method for calibrating the weighing system in accordance with an embodiment of the present disclosure.

Referring to FIG. 3, a method 30 is related to a method of calibrating a weighing system associated with a worksite. Although, the method 30 is explained in conjunction with the weighing system 16 of the worksite 10, it may be envisioned to use the concepts of the method 30 to any other weighing systems measuring loads of different machines on the worksite 10. The worksite 10 may include the first set of machines 12 and, the second set of machines 14 configured to receive a payload from corresponding first set of machines 12.

The weighing system 16 may include multiple payload scales such as the payload scales 18, 20, 22, 24, as represented in the illustrated embodiment. The payload scales 18, 20, 22, 24 are configured to provide readings indicative of different loads. In an embodiment, the weighing system 16 may be in communication with the memory 28 and/or the processor 26. The processor 26 may be configured to implement one or more steps of the method 30.

At step 32, the method 30 includes receiving, from the weighing system 16, the first set of readings indicative of the payload on the first set of machines 12. In an embodiment, the first set of readings may be received from the payload scale 18.

At step 34, the method 30 includes, receiving, from the weighing system 16, the second set of readings indicative of an equivalent payload on the second set of machines 14. The equivalent payload is received from the corresponding first set of machines 12. In one embodiment, the second set of readings may be received from the payload scale 20. In another embodiment, the second set of readings may be determined as a difference of the readings of the payload scales 24 and 22. Further, these first readings and second readings may be stored in the memory 28. In an embodiment, the corresponding second readings may be identified from the memory 28 based on an identifier associated with the first and second set of machines 12, 14 and their interaction.

At step 36, the method 30 includes, formulating a predefined number of equations from the first set of readings and the corresponding second set of readings. A sufficient number of first and second readings may be collected to formulate the equations.

At step 38, the method 30 includes, determining error coefficients of the weighing system 16 by optimizing the predefined number of equations. Each of the first and second readings may be associated with an error coefficient. In an embodiment, the error coefficient may be represented as percentage error. In such a case, the error coefficient may be multiplied with the corresponding first readings, second readings, in the equations. Additionally, or optionally, the readings may be associated with an offset error. Accordingly, increased number of equations may be formulated based on the increased number of unknowns.

Further, these equations may be optimized using suitable optimization techniques such as, LASSO, ridge regression and the like. At step 40, the method 30 includes calibrating the weighing system based on the determined error coefficients.

Such an implementation is useful in calibrating the weighing system 16 efficiently and avoids the problems with dependency on calibrating all the components of the weighing system 16 periodically. Further, loss of operation time during calibration on-site may be prevented as the calibration with the method 30 and the processor 26 may be performed off-line.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of calibrating a weighing system associated with a worksite, the worksite having a first set of machines and, a second set of machines configured to receive a payload from corresponding first set of machines, the method comprising:
   receiving, from the weighing system, a first set of readings indicative of the payload on the first set of machines;
   receiving, from the weighing system, a second set of readings indicative of an equivalent payload on the second set of machines, wherein the equivalent payload is received from the corresponding first set of machines;
   formulating a predefined number of equations from the first set of readings and the corresponding second set of readings;
   determining error coefficients of the weighing system by optimizing the predefined number of equations; and
   calibrating the weighing system based on the determined error coefficients.

2. The method of claim 1, wherein at least one of the predefined number of equations includes a variable representing an offset error.

3. The method of claim 1, wherein the second set of readings is determined as a difference in a tare weight and a departure weight of the second set of machines.

4. The method of claim 1, wherein the predefined number of equations is equal to the product of a number of machines in the first set machines and a number of machines of the second set machines.

5. The method of claim 1, wherein the first set of readings and the second set of readings are stored in a memory of a computer system, and wherein the method is performed off-line.

6. The method of claim 5, wherein the first set of readings or the second set of readings is received from the memory.

7. The method of claim 1, wherein optimizing the predefined number of equations includes using optimization techniques including Least Absolute Shrinkage and Selection Operator, ridge regression, or a combination thereof.

8. A method of calibrating a weighing system associated with a worksite, the worksite having a first set of machines and a second set of machines, the method comprising:
   receiving a first set of readings indicative of a payload on the first set of machines;
   receiving a second set of readings indicative of an equivalent payload on the second set of machines, wherein the equivalent payload is received from the corresponding first set of machines;
   formulating a predefined number of equations from the first set of readings, the corresponding second set of readings, and associated error coefficients; and
   calibrating the weighing system based on the associated error coefficients.

9. The method of claim 8, wherein the second set of readings is provided by a payload scale on the second set of machines.

10. The method of claim 8, wherein a predefined number of equations is equal to the product of a number of machines in the first set machines and a number of machines in the second set machines.

11. The method of claim 8, wherein the second set of readings is determined as a difference between a departure weight and a tare weight of the second set of machines.

12. The method of claim 8, wherein the error coefficients are percentage errors.

13. The method of claim 8, wherein each of the first set of readings and the second set of readings is associated with an offset error.

14. A method of calibrating a weighing system associated with a worksite, the worksite having a first set of machines and a second set of machines, the method comprising:
   receiving, from the weighing system, a first set of readings indicative of a payload on the first set of machines;
   receiving, from the weighing system, a second set of readings indicative of a payload on the second set of machines;
   formulating a predefined number of equations from the first set of readings and the corresponding second set of readings;
   determining error coefficients of the weighing system based on the predefined number of equations; and
   calibrating the weighing system based on the determined error coefficients.

15. The method of claim 14, wherein the second set of readings is determined as the difference between a departure weight and a tare weight of the second set of machines.

16. The method of claim 14, wherein first set of machines includes a first machine, and wherein the first set of readings includes multiple readings from the first machine.

17. The method of claim 14, wherein the second set of readings is received from a memory based on an identifier associated with the first set of machines, the second set of machines, and an interaction between the first set of machines and the second set of machines.

18. The method of claim 14, wherein the determined error coefficients are percentage errors.

19. The method of claim 14, wherein receiving the first set of readings includes receiving a first set of readings from payload scales on the first set of machines.

20. The method of claim 14, wherein calibrating the weighing system includes manually calibrating one or more payload scales of the weighing system based on the determined error coefficients.

* * * * *